United States Patent
Groft et al.

(10) Patent No.: US 8,330,624 B2
(45) Date of Patent: Dec. 11, 2012

(54) ENHANCEMENTS TO METERLESS REMOTE PARKING MONITORING SYSTEMS

(76) Inventors: Eric Groft, Lowell, MA (US); Kirby Andrews, Westport, CT (US)

(*) Notice: Subject to any disclaimer, the term of this patent is extended or adjusted under 35 U.S.C. 154(b) by 306 days.

(21) Appl. No.: 12/805,595

(22) Filed: Aug. 6, 2010

(65) Prior Publication Data

US 2011/0063079 A1    Mar. 17, 2011

(51) Int. Cl.
*B60Q 1/48* (2006.01)
*G08G 1/01* (2006.01)

(52) U.S. Cl. .................................. 340/932.2; 340/933
(58) Field of Classification Search .............. 340/10.1, 340/932.2
See application file for complete search history.

(56) References Cited

U.S. PATENT DOCUMENTS

| | | | |
|---|---|---|---|
| 7,135,991 B2 * | 11/2006 | Slemmer et al. | 340/932.2 |
| 7,731,088 B2 * | 6/2010 | Moynihan et al. | 235/384 |
| 2005/0088320 A1 * | 4/2005 | Kovach | 340/933 |
| 2009/0227240 A1 * | 9/2009 | Sheets | 455/414.2 |

* cited by examiner

*Primary Examiner* — Brian Zimmerman
*Assistant Examiner* — Omer S Khan
(74) *Attorney, Agent, or Firm* — Perman & Green, LLP

(57) ABSTRACT

A remote meterless parking monitoring system including a plurality of individual parking spaces, a plurality of vehicle detector/RFID units for monitoring the status of the individual parking spaces; at least one Gateway device responsive to the plurality of vehicle detector/RFID units; a Command and Control Server for employing numerous security provisions at least including encryption of data, Virtual Privacy Networks, firewalls and authenticated connections and responsive to data from said Cellular gateway via the internet; and the Command and Control Server uses the status of each space and the ID from the motorist's RFID tag to cross reference data according to a Policy database and identifying the motorist through a Motorist Database including information about the motorist's mailing address, vehicle payment account balance or other information.

4 Claims, 4 Drawing Sheets

ENHANCEMENTS TO METERLESS REMOTE PARKING MONITORING SYSTEMS

BACKGROUND OF THE INVENTION

1. Field of the Invention

The invention relates to: (1) using RFID tags to identify parking classification; (2) use of RFID tags to allow temporary exemptions to individuals for purposes of special events, temporary injury or other short-term allowances for special parking privileges; and (3) using RFID tags to identify unique customers and effect payment against an account; and (4) using RFID tags to identify unique customers and effect automatic issuance of parking citations.

2. Related Art

The provisional patent application Ser. No. 61/213,752, filed 10 Jul. 2009 and entitled: GEN II Meter System with Multiple Detection Sensor Types, Fault Tolerance Methods, Power Sharing and Multiple User Interface Methods. In a system such as the GEN II Meter System (Provisional Patent Application Ser. No. 61/202,201, Filed 5 February) built with multiple processors contained in a single node provides internal monitoring of the operability of all units. An alphanumeric identifying message ID for each message is transmitted from a component to identify intermittent and other communication errors such as consistently "lost" packets of information within a RAM system (patent application Ser. No. 11/802,244, filed 21 May 2007) for parking management. An alphanumeric identifying message ID for each message transmitted from a component to identify intermittent and other communication errors such as consistently "lost" packets of information within a RAM system for Parking Management. An alphanumeric message ID confirms message delivery between radio network components in the RAM system for parking. The alphanumeric message ID confirms message delivery between radio network components in the RAM system for parking. The above alphanumeric message ID confirms message delivery between radio network components in the RAM system for parking. A Reed relay is used as a method of time stamping Parking Meter collections and sending sets of commands either directly from handheld implements or through a radio network.

The provisional patent application Ser. No. 61/202,201 filed 5 Feb. 2009 which relates to multiple task specific processors such as an Application Processor, a Meter Controller and a Radio Processor all controlled via a shared SPI bus and using rechargeable batteries and solar power sources for controlling and monitoring a vehicle parking meter system.

The provisional patent application 61/213,995, filed 6 Aug. 2009 and entitled: Radar Vehicle Detection System, employs a specific form of radar technology to Remote Asset Management (RAM)) parking systems such as that disclosed in U.S. patent application Ser. No. 11/802,244, filed 21 May 2007.

The invention entitled: Parking System Employing RAM Techniques, Ser. No. 11/802,244, filed 21 May 2007, which relates to the management of vehicle parking systems and, in particular, to such systems using remote management techniques for enhancing management efficiency and to provide solutions to the parking system that could otherwise not be managed by: (1) sensing, collecting, recording and displaying data regarding all aspects of the environment pertaining to the parking system; (2) analyzing the data collected to create actionable outputs responsive to the needs of the public and the management of the parking systems; (3) communicating with the various parking system components; and (4) receiving feedback to perform requested operations for the parking system.

The provisional patent application Ser. No. 61/213,768, entitled: Meterless Remote Parking Monitoring System, filed 6 Aug. 2009 relates to: (1) using Radio Frequency Identification tags (RFID) for permitting in a parking lot to identify valid parkers from violators of permitted parking; (2) employing space-by-space vehicle detection in addition to RFID equipped permits; (3) employing a combined RFID permitting system with vehicle detection into a RAM system for Parking Management; (4) transmitting all proximate RFID tags read by any RFID reader in the Meterless Remote Parking Monitoring System; and (5) a version of the foregoing systems that uses the same technology for a paid parking environment.

SUMMARY OF THE INVENTION

Using RFID Tags to Identify Parking Classification

The problem solved relates to the fact that various parking lots may be used by various types of occupants with varying desired use profiles. For example, a university parking area may be used by both instructors, students housed on campus and commuting students. The university may wish to grant instructors unlimited parking privileges, limit commuting students parking to 6 hours at a time and allow students housed on campus a maximum of 90 minutes of parking at a rime. These varying limits can cause difficulty in determining if a vehicle, as noted by vehicle presence detectors has exceeded, has exceeded the allowable time granted to the individual motorist.

The solution is that each RFID tag is recorded using its unique number in a data base in the Command and Control Interface (CCI) reference in the aforementioned Ram patent. This data record would also contain information about the motorist to whom it was issued and the classification of permit that was issued to them. When the RFID tag is read by the remote space monitoring system, its unique ID number is transmitted to the CCI. This unique number is then cross-referenced by the CCI to determine what kind of permit the motorist in the space was issued. The type of motorist is then cross-referenced against a set of data records outlining the limits for each location and each type of motorist. A violation notice can then be generated and transmitted as needed to enforcement personnel once the established time limit has been exceeded.

Use of RFID Tags to Allow Temporary Exemptions to Individuals for Purposes of Special Events, Temporary Injury or Other Short Term Allowances for Special Parking Privileges The problem is that individual motorists, in some cases, are granted special parking privileges for a specific amount of time. The reasons can vary from a temporary physical injury to a special event. Such situations create a number of falsely identified violations in a meterless parking system.

The solution is that either groups of permits or even individual permits can be granted a special policy to grant special privileges to park in spaces otherwise unavailable to them (i.e. handicapped spaces, spaces normally reserved for commuting students, etc.) for a specified time. A record can be made that associates the unique RFID tag numbers to specific time limits and locations. Such assignments operate only for the time desired by the parking managers.

Using RFID Tags to Identify Unique Customers and Effect Payment Against a Parking Account The problem is that Meterless Parking installations do not lend themselves to allowing users to pay for time parked based on usage. Without meters, users must either purchase open-ended permits or the manager of the parking lot must employ attendants to monitor the entrance and exits of the parking area to allow users to pay only for the time they use the lot.

The solution is that by using the unique ID from each RFID tag, the unique motorist in each spot can be definitely identifies as well as the exact arrival and departure time. The data transmitted by the meterless remote parking monitoring system can be compared with information stored in the Command and Control Interface (CCI) that identifies the motorist to whom the RFID permit was issued. This information can then charge an account associated with the motorist for the time that the motorist occupied the space. The account used to charge parking fees can be either an account set up and funded with a credit balance on behalf of the motorist ahead of time or a credit or bank account authorized by the motorist to which the fees can be charged directly. The rates and policies for each location and motorist type would be stored in additional tables in databases accessed by the CCI to assure the correct fee is charged based both on the motorist in question (should different classes of motorist have different rates) and the location in which they parked.

Using RFID Tags to Identify Unique Customers and Effect Automatic Issuance of Parking Citations The problem is that even with remote monitoring of meterless parking spaces, deploying an individual is still needed to issue a citation to the motorist.

The solution is that the unique ID of the RFID tag used by a motorist can be cross-referenced against the motorist data in the data bases accessed by the Command and Control Interface (CCI) to determine the mailing address at each violating motorist. Using this information, a parking violation can be issued by mailing a citation notice to the motorist's mailing address. Additionally, it a parking manager so chooses, permits of those individuals with some number of outstanding violations can be flagged as suspended and invalid for use. This would allow the manager to take corrective action such as towing or immobilizing the vehicle to cause the motorist to respond to the outstanding citations.

DETAILED DESCRIPTION

Figure 1:
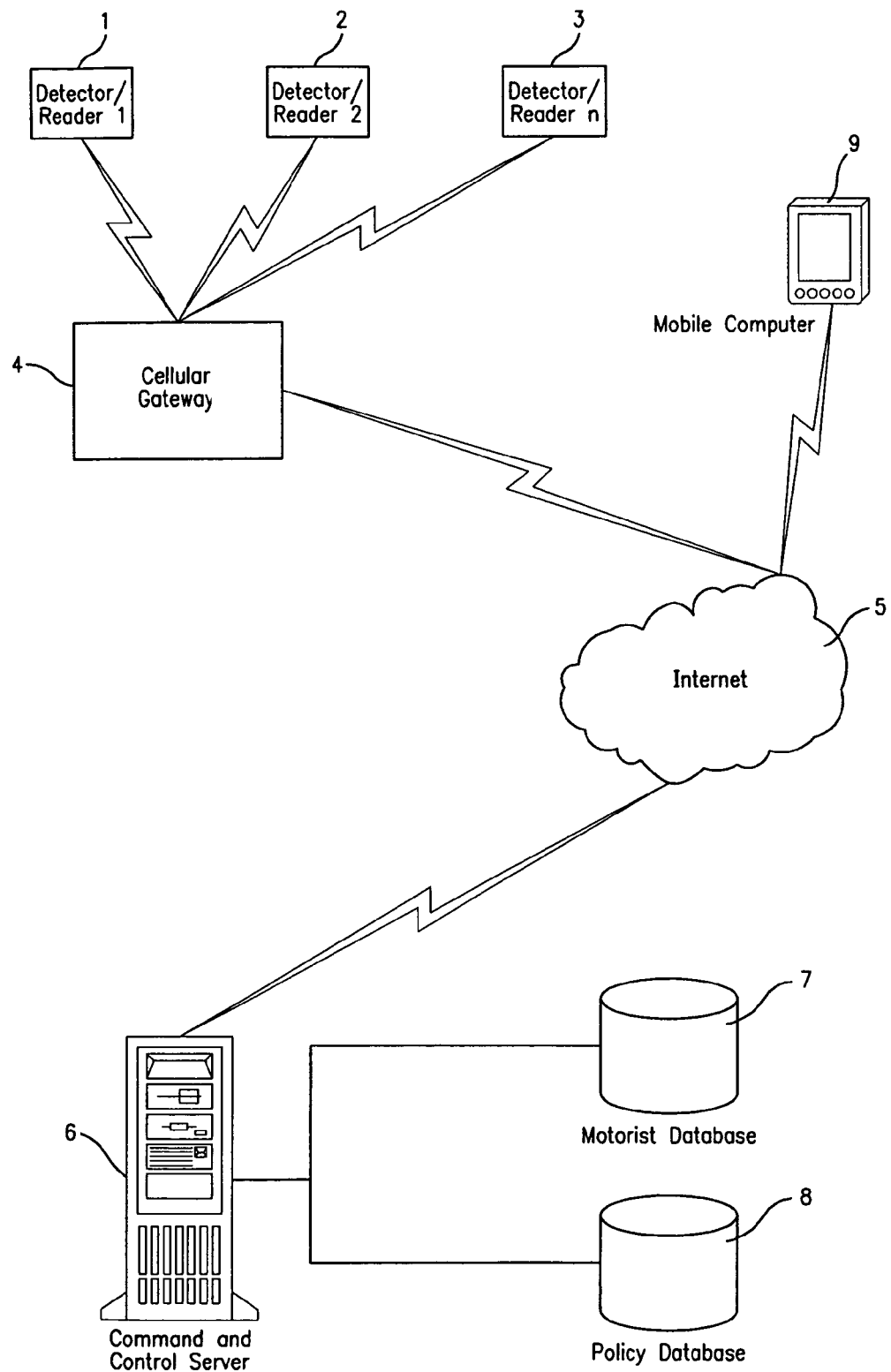
FIG. 1 outlines the components established in the provisional patent application Ser. No. 61/213,7868 for a remote meterless parking monitoring system.

With respect to FIG. 1, elements 1, 2 and 3 represent a plurality of vehicle detector/RFID reader devices which are monitoring the status of individual parking spaces. They communicate with one or more Gateway devices (such as Cellular Gateway 4). The device pictured in this diagram is one which connects to the internet via a cellular connection, but it is understood that gateways can connect to the internet 5 using any of a number of connection technologies as conditions would merit. Data is passed along to the Command and Control Server 6 from the internet 5. While not shown, or specifically required, the connection from the Vehicle Detector/R units 1, 2 and 3 to the Command and Control Server 6 can employ numerous security provisions including, but not limited to, encryption of data, Virtual Private Networks (VPNs), firewalls and authenticated connections. Once the data is transmitted to the Command and Control Server 6, the status of each space and the ID from the motorist's RFFID tag can be used to cross reference data according to the Policy database 8 regarding the spaces reporting an updating status and the motorist—who is identified by the RFID tag's ID number through the Motorist Database 7. The data is processed as seen in FIG. 2 and any alerts for enforcement dispatched via connections to the mobile computers 9 in use by enforcement personnel and/or used to create automated citation notices for mailing to the violating motorists.

Figure 2:
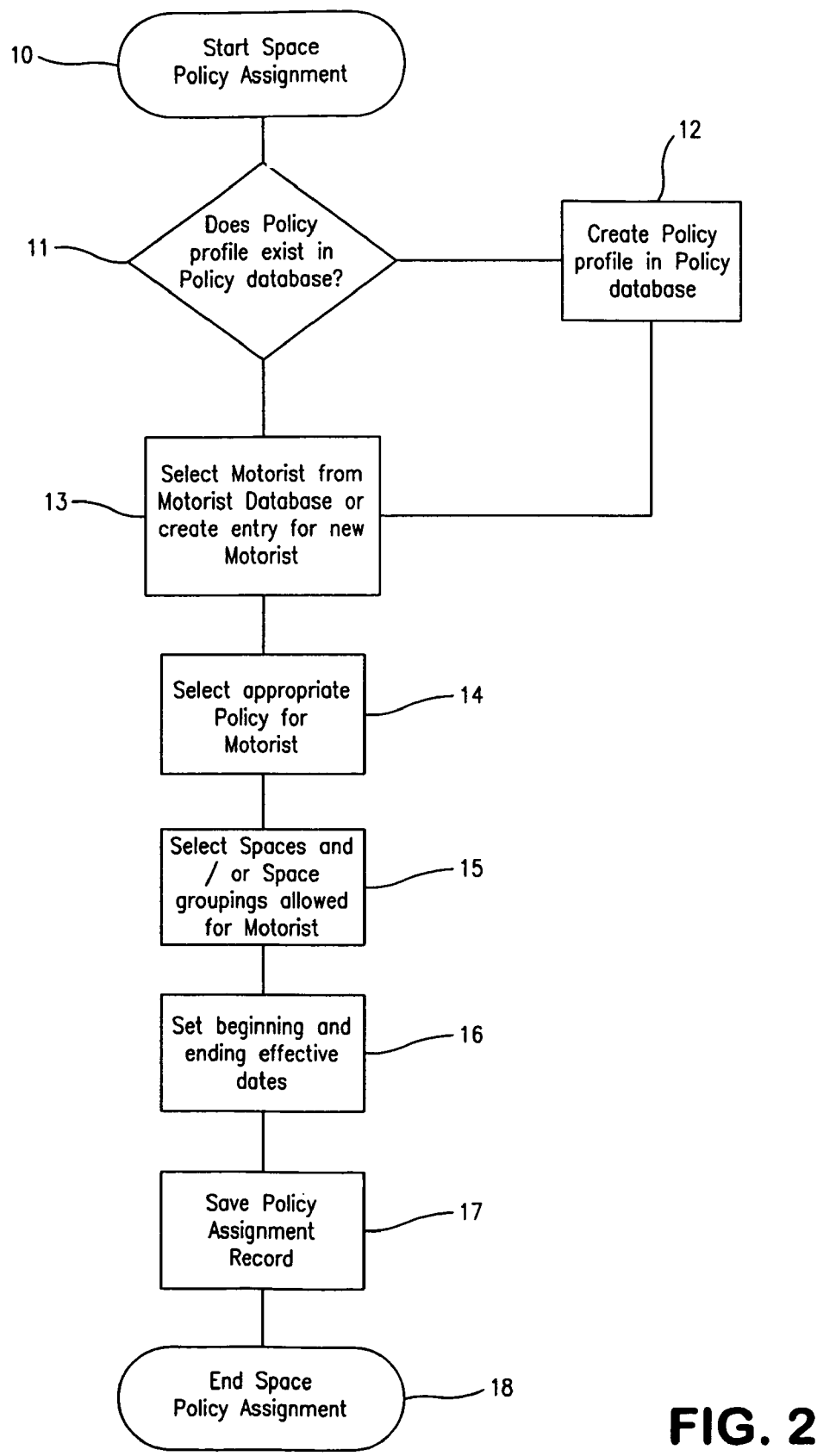
FIG. 2 illustrates a flow diagram of a sample process by which motorists may be associated with a particular parking policy.

FIG. 2 illustrates a flow diagram of a sample process by which motorists may be associated with a particular parking policy. This process starts at Start Space Policy Assignment component 10 after which the user determines if the policy desired already exists in the policy database 11. If the policy exists, the process continues directly to the step 13. Otherwise the process first passes to Create Policy Profile in Policy Database step 12 where the desired policy is created before proceeding to step 13. In step 13, the motorist is chosen from the existing motorists in the motorist database or created if they do not exist. In step 14, the proper space policy is selected for the motorist. In step 15, the spaces, lots of other types of groupings are assigned to the motorist so that space restrictions can be applied. In step 16, the time frames for the policy assignment are defined so that the assignment can be applied to begin and/or cancelled in the future without further intervention. The record is saved to an assignment database in step 17 before finishing the process in step 18.

While this is a sample of how a policy might be created, further embodiments are envisioned in which default policies could be assigned to motorists and alternative policies could be applied for short periods of time by adding notations to the assignment records as to which policy is currently active on a dynamic basis by the Command and Control Interface.

Figure 3:
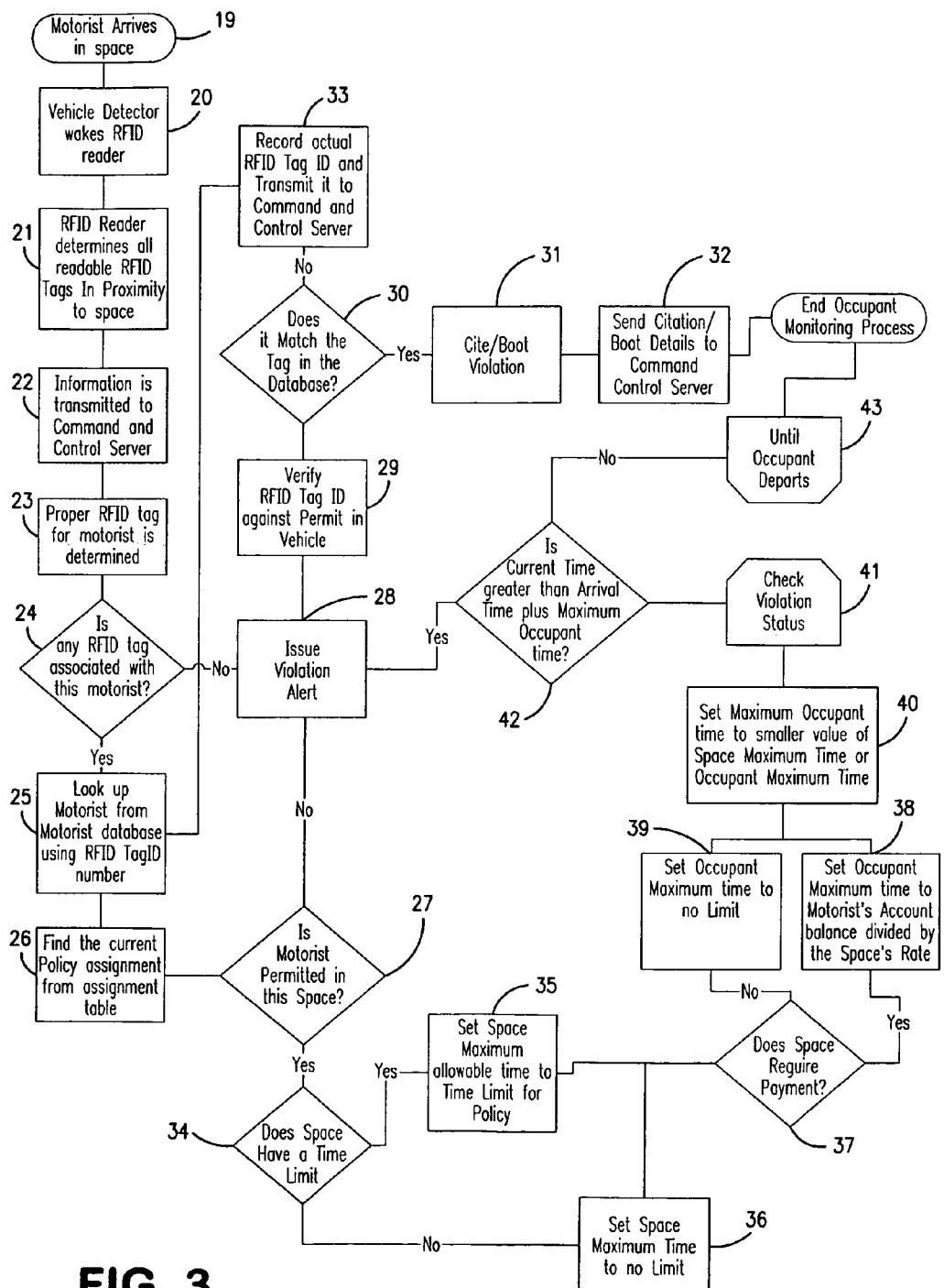
FIG. 3 illustrates a flow diagram of a sample process by which motorists may be associated with a particular parking policy.

With respect to FIG. 3, the process starts at step 19 when a vehicle arrives in the parking space. This causes the RFID reader to be awoken in step 20. All of the RFID tags in the reading range of the reader to be read in step 21 and the results transmitted to the Command and Control Server in step 22. The Command and Control Server then determines the proper RFID tag to associate with the newly arrived motorist as laid out in the Meterless Remote Parking Monitoring System, provisional patent Ser. No. 61/213,768/in step 23. The results of the RFID tag to motorist association may encounter situations where there is no tag to associate with the newly arrived motorist. This is determined at step 24 and if no tag is associated with the motorist, a violation alert is issued in step 28. Otherwise, the motorist's identity is determined from the Motorist database in step 25 and the current Policy assignment is determined for that motorist by examining the record policy association records in step 26. The motorist's space allowances are checked to see if their permit applies to the space in which they have parked in step 27. In the case that a motorist is not permitted in the space, a violation alert is issued to enforcement personnel in step 28.

For motorists permitted to park in the associated space, further monitoring is enacted. First, the policy is examined to determine if a time limit exists for parking in step 34. If a time limit exists, the spaces' maximum occupancy time is set to equal that time limit in step 35. Otherwise, it is set to "No Limit" in step 36. Then it is determined if the policy requires monetary payment for time in step 37. If the policy requires payment, the motorist's account balance is checked to determine the maximum time that can be purchased with the value in their account in step 38 by dividing the balance by the rate for the space. This value is used to set the occupant's maximum time. If no payment is required by the policy, the occupant's maximum time is set to "No Limit" in step 39. The Maximum occupant time is then compared to the space's maximum occupancy time and re-set to equal the space's maximum occupancy time if is shorter in step 40.

Once set, the status of the space is continuously monitored in a loop until the motorist departs the space (steps 41-43). If at any time, the current time of day is after the allowable time—defined as the time of the motorists arrival plus the maximum occupant time as determined in steps 40-42, a violation alert is generated and issued to enforcement personnel in step 28.

Once enforcement personnel receive a violation alert on their mobile computers in step 28, they report to the space to verify the RFID Permit in the vehicle against the reported RFID tag ID (or lack of permit) generated by the system in step 29.

If the system has generated a valid violation in step 30 as determined by comparing the system reported RFID tag ID to the permit in the vehicle, the enforcement person issues a citation to the motorist or boots the vehicle in step 31 and sends the information related to that citation/boot back to the Command and Control Server in step 32 using the mobile computer.

If, instead, the system generated a potentially false violation because an incorrect RFID tag ID was associated with the space or the tag could not be read at all, the enforcement office records the number visible on the permit in step 33 and transmits it back to the Command and Control Server. From there, the process resumes at step 25 and any valid violations alerted as previously described.

Figure 4:
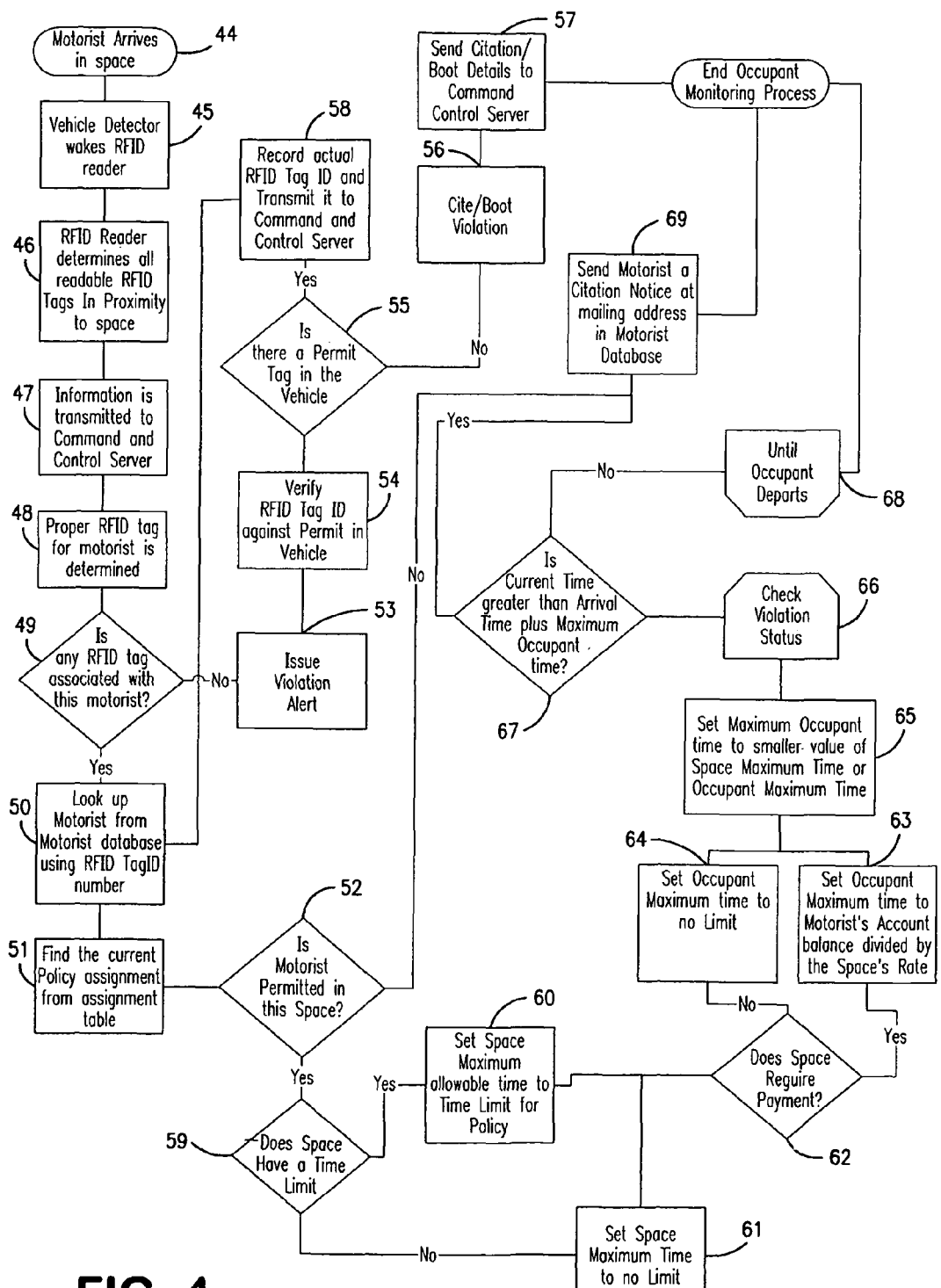
FIG. 4 is a flow diagram of a process for identifying violations by the system and then automatically cited when the embodiment of the application allows.

FIG. 4 illustrates how violations are identified by the system and then automatically cited when the embodiment of the application allows. The process starts at step 44 when a vehicle arrives in the space. This causes the RFID reader to be awoken in step 45. All of the RFID tags in the reading range of the reader to be read in step 46 and the results transmitted to the Command and Control Server in step 47. The Command and Control Server then determines the proper RFID tag to associate with the newly arrived motorist as laid out in the Remote Parking Monitoring System (provisional patent Ser. No. 61/213,768) in step 48. The results of the RFID tag to motorist association may encounter situations where no tag to associate with the newly arrived motorist. This is determined at step 49, and if no tag is associated with the motorist, a violation alert is issued in step 53.

Once enforcement personnel receive a violation alert on their mobile computers in step 53, they report to the space to verify the RFID permit in the vehicle against the reported RFIFD tag ID (or lack of permit) generated by the system in step 54.

If the system has generated a valid violation in step 55 as determined by comparing the system reported RFID tag ID to the permit in the vehicle, the enforcement person issues a citation to the motorist or boots the vehicle in step 56 and sends the information related to that citation/boot back to the Command and Control Server in step 57 using the mobile computer.

If, instead, the system generated a potentially false violation because an incorrect RFID tag ID was associated with the space or the tag could not be read at all, the enforcement officer records the number visible on the permit in step 58 and transmits it back to the Command and Control Server. From here the process resumes at step 50 and any valid violations are alerted as previously described.

If a tag is successfully associated with the new motorist, his identity is determined from the Motorist database in step 50 and the current Policy assignment is determined for that motorist by examining the record policy association records in step 51. The motorist's space allowances are checked to see if their permit applies to the space in which they have parked in step 52. In the case that a motorist is not permitted in the space, a citation is generated and mailed to the motorist based on the address information stored in the motorist data base in step 69.

For motorists permitted to park in the associated space, further monitoring is enacted. First, the policy is examined to determine if a time limit exists for parking in step 59 If a time limit exists, the space's maximum occupancy time is set equal to that time limit in step 60. Otherwise, it is set to "No Limit" in step 61. Then it is determined if the policy requires monetary payment for time in step 62. If the policy requires payment, the motorist's account balance is checked to determine the maximum time that can be purchased with the value in their account in step 63 by dividing the balance by the rate for the space. This value is used to set the occupant's maximum time. If no payment is required by the policy, the occupant's maximum time is set to "No Limit" in step 64. The maximum occupant time is then compared to the maximum occupancy time of the space and re-set to equal the maximum occupancy time of the space if it is shorter in step 65.

Once set, the status of the space is continuously monitored in a loop until the motorist departs the space (steps 66-68). If at any time, the current time of day is after the allowable time—defined as the time of the motorist's arrival plus the maximum occupant time as determined in step 67, a citation is generated and mailed to the motorist based on the address on the address information stored in the motorist data base in step 69.

The invention claimed is:

1. A process in a remote meterless parking monitoring system the time frames for the assigned space policy so that the assignment can be applied to at least one of beginning and cancelled in the future without further intervention, comprising the steps of:
   a Vehicle Detector wakes an RFID Reader;
   the RFID Reader determines all readable RFID Tags in proximity to the parking space;
   the RFID Reader determination is transmitted to a Command and Control Server;
   the proper RFID Tag for a Motorist is determined;
   the Command and Control Server determines if any RFID Tag is associated with the Motorist;
   if no proper RFID tag exists, a violation alert is issued;
   if a proper RFID tag is associated with the motorist, look up motorist from a motorist database using the RFID tag number; and
   determine if the Motorist is permitted in the Parking Space;
   find the current Parking Policy assignment from an assignment table; and if the motorist is not permitted in the parking space, issue a violation alert,
   if the Motorist is permitted in the Parking Space, determine if the Parking Space has a Time Limit;
   if the Parking Space has a time limit Set Space Maximum Allowable Time to Time Limit for the Parking Policy;
   if the Parking Space does not have a Time Limit, Set Parking Space Maximum Time Limit to NO LIMIT;
   determine if Parking Space requires payment;

if the Parking Space requires payment, Set Occupant Maximum time to smaller value of Space Maximum Time or Occupant Maximum Time;

if the Parking Space does not require payment, set Occupant Maximum Time to NO Limit;

set Maximum Occupant time to smaller value of Space Maximum Time or Occupant Maximum Time; check violation Status;

determine if Current Time is greater than Arrival Time plus Maximum Occupant Time;

if Current Time is greater than Arrival Time plus Maximum Occupant Time the issue Violation Alert;

if Current Time is not greater than Arrival Time plus Maximum Occupant Time, then wait until occupant departs; and end Occupant Monitoring Process.

2. A process in a remote meterless parking monitoring system for issuing violation alerts and boot violations as in claim 1, further comprising the steps of:

recording the actual RFID tag ID and transmit it to the Command and Control Server;

if a violation alert is issued, verify the RFID tag against the permit in the Motorist's Vehicle and determine if the tag matches the tag in the database stored in the Command and Control Server;

issue a citation/boot violation; and send citation/boot details to the Command and Control Server to end the occupant monitoring process.

3. A process for identifying violations and issuing automatic citations in a remote meterless parking monitoring system as in claim 1, further comprising the steps of:

if a violation alert is issued, verify RFID tag against the permit in the motorist's vehicle;

determine if there is a Permit Tag in the vehicle and if YES, record actual RFID tag ID and Transmit it to the Command and Control Server;

if there is no Permit Tag in the vehicle, issue a Citation/Boot Violation;

send Citation Boot Details to the Command and Control Server and end Occupant Monitoring Process.

4. A process for identifying violations and issuing automatic citations in a remote meterless parking monitoring system as in claim 1, further comprising the steps of:

determine if the Parking Space requires payment:

if the Parking Space requires payment, set Occupant Maximum time to Motorist's Account Balance divided by the Parking Space's Rate;

determine if Current Time is greater than Arrival Time plus Maximum Occupant Time;

if Current Time is greater than Arrival Time plus Maximum Occupant Time, send motorist a Citation Notice at mailing address in Motorist Database and End Occupant Monitoring process.

* * * * *